No. 885,299. PATENTED APR. 21, 1908.
W. SCHWEDE.
GRAIN FEEDING AND WEIGHING APPARATUS.
APPLICATION FILED JULY 21, 1906.
4 SHEETS—SHEET 1.

Witnesses,
George Voelker
Hattie Smith

Inventor,
Wilhelm Schwede
by Lothrop & Johnson
his Attorneys.

No. 885,299. PATENTED APR. 21, 1908.
W. SCHWEDE.
GRAIN FEEDING AND WEIGHING APPARATUS.
APPLICATION FILED JULY 21, 1906.
4 SHEETS—SHEET 2.

Witnesses,
George Voelker
Hattie Smith

Inventor,
Wilhelm Schwede
by Lothrop & Johnson
his Attorneys.

No. 885,299. PATENTED APR. 21, 1908.
W. SCHWEDE.
GRAIN FEEDING AND WEIGHING APPARATUS.
APPLICATION FILED JULY 21, 1906.

4 SHEETS—SHEET 3.

Witnesses,
George Voelker
Hattie Smith

Inventor,
Wilhelm Schwede
by Lothrop & Johnson
his Attorneys.

No. 885,299. PATENTED APR. 21, 1908.
W. SCHWEDE.
GRAIN FEEDING AND WEIGHING APPARATUS.
APPLICATION FILED JULY 21, 1906.

4 SHEETS—SHEET 4.

Witnesses,
George Voelker
Hattie Smith

Inventor,
Wilhelm Schwede
by Lothrop & Johnson
his Attorneys.

UNITED STATES PATENT OFFICE.

WILHELM SCHWEDE, OF SANBORN, MINNESOTA, ASSIGNOR OF ONE-HALF TO HENRY SCHWERDTFEGER, OF SANBORN, MINNESOTA.

GRAIN FEEDING AND WEIGHING APPARATUS.

No. 885,299.  Specification of Letters Patent.  Patented April 21, 1908.

Application filed July 21, 1906. Serial No. 327,149.

*To all whom it may concern:*

Be it known that I, WILHELM SCHWEDE, a citizen of the United States, residing at Sanborn, in the county of Redwood and State of Minnesota, have invented certain new and useful Improvements in Grain Feeding and Weighing Apparatus, of which the following is a specification.

My invention relates to improvements in feeding apparatus, the object being particularly to provide improved mechanism for regulating the feed of grain to the breaking rollers of a flour-mill.

Figure 1:
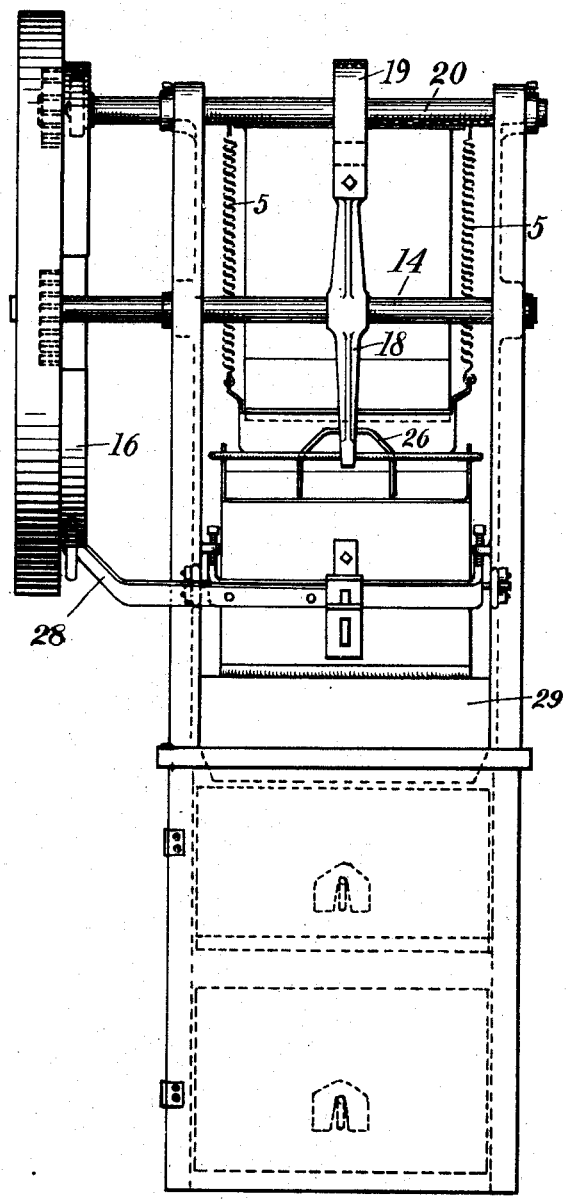
Figure 2:
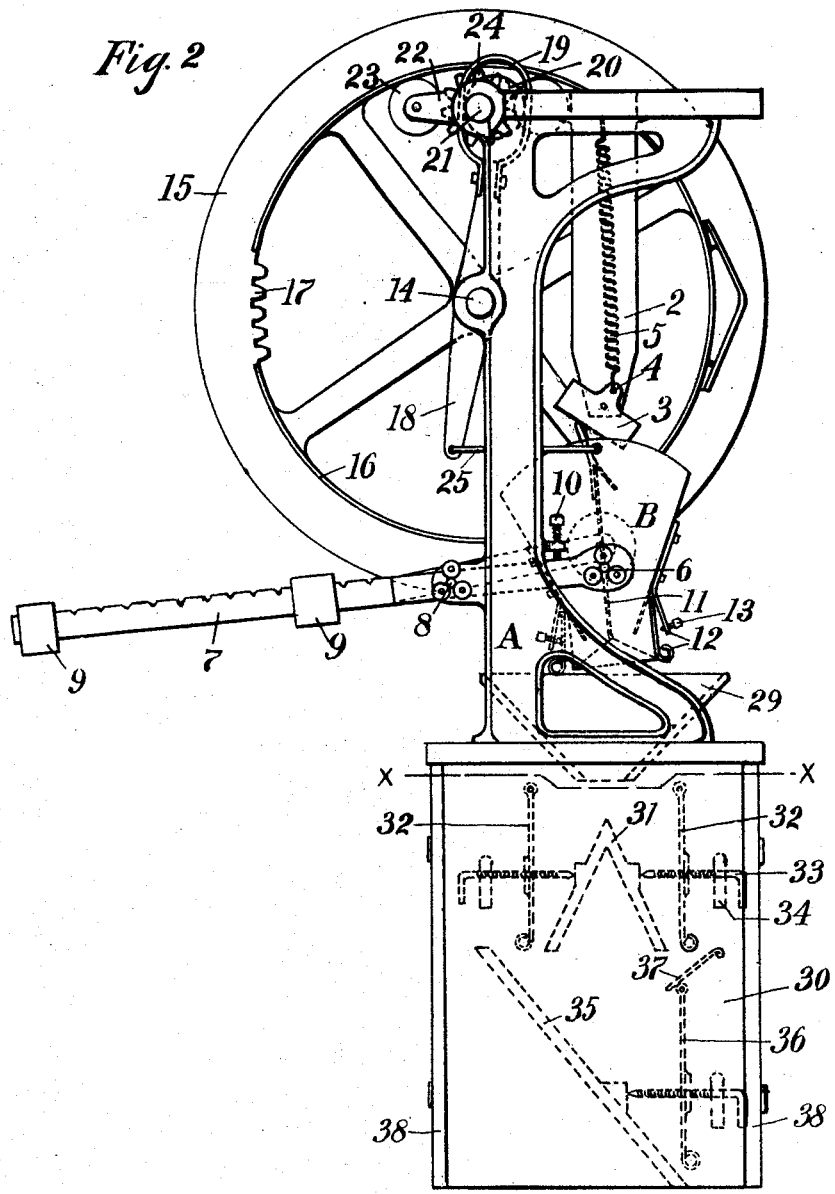
Figure 3:
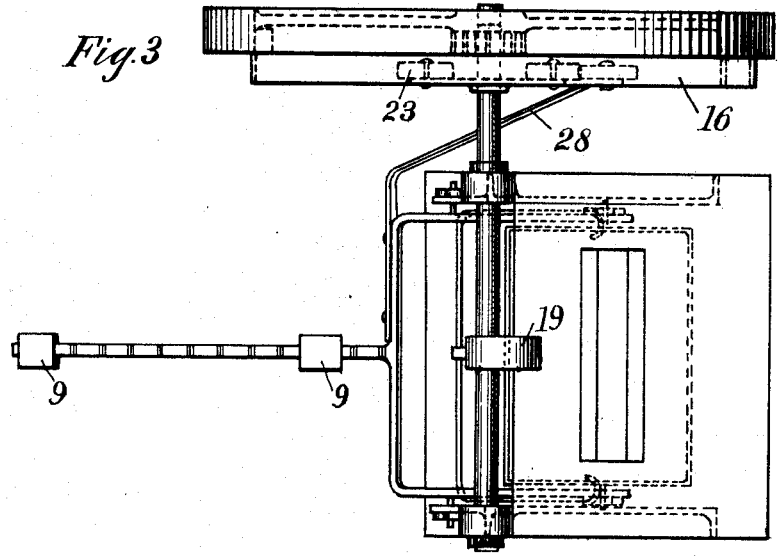
Figure 4:
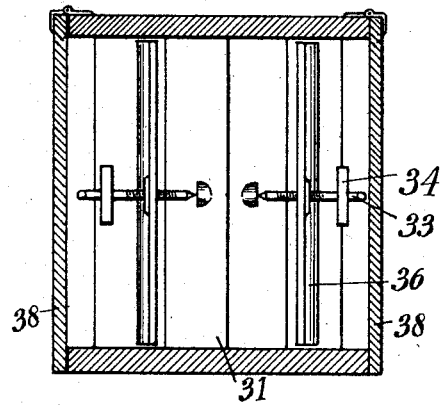
Figure 5:
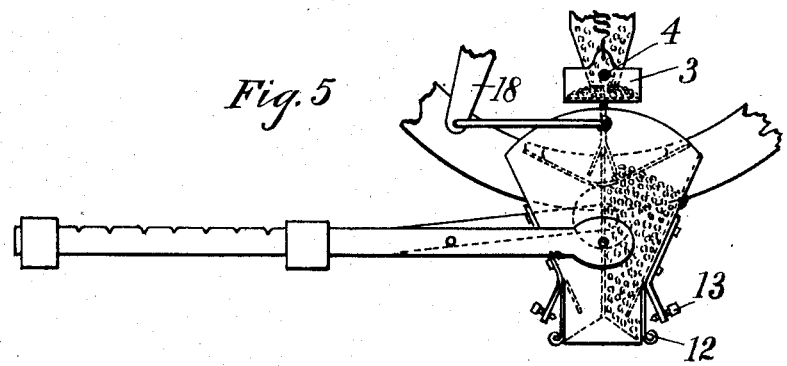
Figure 6:
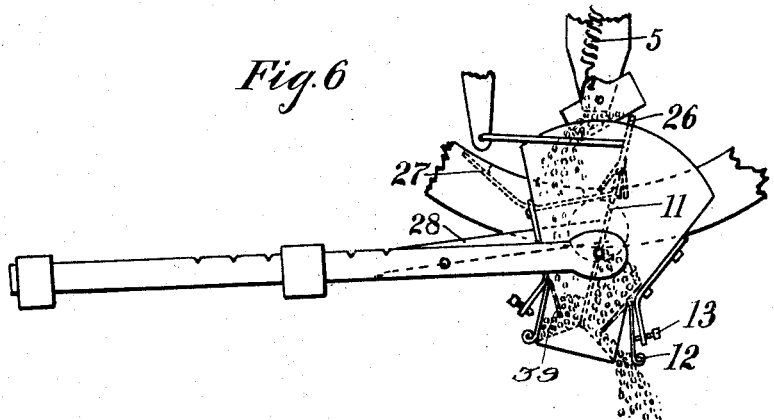
Figure 7:
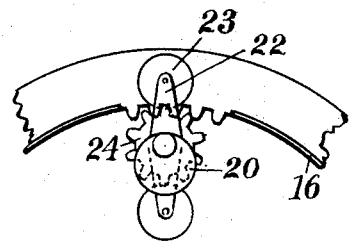
Figure 8:
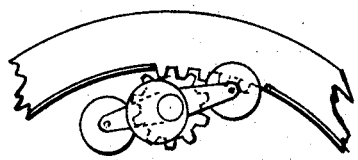
Figure 9:
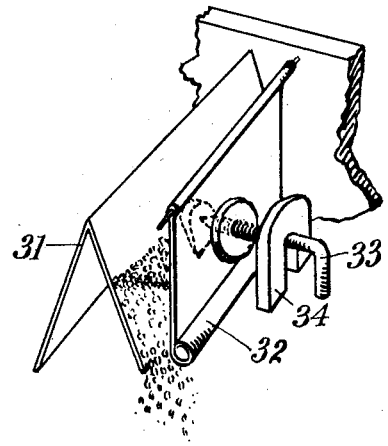

In the accompanying drawings forming a part of this specification, Figure 1 is a front elevation of my improved apparatus, Fig. 2 is a side elevation of the same, Fig. 3 is a top view, Fig. 4 is a section on line x—x of Fig. 2, Fig. 5 is a side elevation of weighing apparatus forming part of the invention. Fig. 6 is a similar view with the parts in changed position, Figs. 7 and 8 are details of part of the actuating mechanism for the weighing apparatus, and Fig. 9 is a detail of part of the valve mechanism for controlling the delivery of the grain.

In the drawings A represents the framework of the apparatus supporting, at its upper end, an inlet tube or conduit 2. In connection with the lower end of the conduit is arranged a gate 3 having hinged support 4 upon the sides of the conduit and provided with a restraining spring 5. Arranged below the conduit 2 is a weighing magazine B. The magazine B has pivotal support 6 upon the end of a scale-arm 7, the scale-arm having fulcrum support 8 at the rear of the apparatus. Weights 9 of ordinary construction are slidable upon the scale-arm. The tilting of the scale-arm upon its fulcrum is limited by an adjustable stop 10. The weighing magazine B is divided by a vertical partition 11 to form two compartments each compartment being provided with an outlet opening closed by a hinged door 12. The opening movement of each door is limited by an adjustable stop 13. A lip 39 preferably extends inward from the hopper wall above each door 12 to limit the flow of grain to the discharge outlets of the hopper.

The weighing magazine is actuated in the following described manner: Having journaled support 14 at one side of the apparatus is a drive-wheel 15, adapted in use to be constantly rotated. The drive-wheel is provided with a side rim 16 partially cut away on one side of the wheel, the wheel being formed with inwardly extending gear-teeth 17 at said cut-away portion. Loosely fulcrumed upon the shaft 14 is a lever-arm 18 carrying at its upper end an eccentric ring 19 inclosing an eccentric 20 mounted upon a shaft 21, journaled above, and parallel to, the shaft 14. The shaft 21 carries upon one end a cross-arm 22, upon the ends of which are journaled rollers 23 in position to travel upon the inner side of the rim 16, the cross-arm thus serving as a means for supporting the rollers 23 upon opposite sides of the eccentric 20. Also carried by the end of the shaft 21 adjacent to the cross-arm 22 is a gear 24 which engages with the teeth 17 as hereinafter pointed out. The lower end of the lever-arm 18 is connected by a link 25 with the upper end of the magazine B. In operation one of the rollers 23 will travel upon the rim 16 until the gear 24 reaches the teeth 17. The cross-arm will then be turned a half revolution by means of the gear 24 engaging with the teeth 17, bringing the other roller 23 into engagement with the rim as shown in Figs. 7 and 8. This turns the lever 18 through the medium of the eccentric and eccentric ring 19 and 20 to turn the magazine upon its support.

When the magazine is in normal or raised position it will hold the gate 3 open by means of the plate 26 supported upon the top of the partition 11 and adapted to engage one side of the gate 3 to open the conduit when the magazine is raised, as shown in Fig. 6. The plate 26 has a divided lower end, as shown, to allow it to straddle and swing upon the top of the partition 11. When enough grain has passed into one side of the magazine to overbalance the weight upon the scale-arm, the scale-arm will be tilted to carry the magazine to lower position as shown in Fig. 5, releasing the gate 3 to allow it to be closed by its springs 5. Thereafter the magazine will be tilted by the rotation of the drive-wheel as heretofore described, when the weight of the grain against the door 12 will force the door open and allow the grain to be discharged. As the grain is discharged from the filled side of the magazine, the magazine being lightened will allow the scale-arm to resume normal position and raise the magazine. As the magazine rises, the plate 26 will strike the adjacent side of the gate 3 turning the gate into open position and allowing the other side of the magazine to fill. In order to insure the tilting of the scale-arm to lower the magazine in case the weight of the grain is insufficient, I provide a cam 27 upon the inner side of the drive-wheel opposite to the teeth 17, which will strike the end of an arm 28 carried by the scale-arm to tilt the arm and lower the magazine.

From the weighing magazine the grain will pass through a hopper 29, into and through a delivery chamber 30. A series of valves and partitions are arranged within the chamber 30 to regulate the flow of grain. In the upper end of the chamber 30 is arranged an inverted V shaped partition 31. Upon each side of the partition 31 is hinged a valve 32, held separated from the lower end of the partition by a screw 33 threaded through the valve and bearing against the partition. The screw carries a suitable weight 34, by means of which the valve is held in normal position. By means of the screw 33 the valves 32 may be adjusted to and from the partition. Below the partition 31 is arranged an inclined wall 35, in connection with which works a valve 36 corresponding to the valves 32 and similarly adjusted and counterweighted. A guide plate 37 is arranged above the valve 36. By means of the valves 32 and 36 the passage of grain through and from the chamber 30 is regulated. The chamber 30 is provided with suitable doors 38. It will thus be evident that in the operation of the machine, the grain passing through the inlet conduit will be weighed by the magazine B, and predetermined weights of grain passed into and through the chamber 30. As soon as the amount of grain passed into the magazine overbalances the weight upon the scale-arm, the scale-arm will tilt, lowering the magazine, and thereafter the magazine will be tilted by the connection between the magazine and drive-wheel, as heretofore pointed out, to allow the grain to be discharged from the magazine. The lightened magazine will then resume its normal condition and the operation will continue.

The doors 12 are of such weight that when the hopper is in the tilted position shown in Fig. 6 the grain upon the upper or filling side of the hopper will not exert enough pressure against its discharge door 12 to open it. It will thus be evident that on account of the tilted position of the hopper the pressure of the grain against the door 12 upon the lower or discharging side of the hopper will be far greater than that against the door upon the upper or filling side of the hopper.

I claim as my invention:

1. In an apparatus of the class described, the combination of a fulcrumed scale arm, a magazine pivotally supported upon the inner end of said arm, a partition wall in the magazine, a pair of gravity outlet doors upon opposite sides of the lower end of said magazine, and means for tilting the magazine upon its pivotal support when in lowered position to cause the contained grain in the lower side of the magazine to force open the adjacent discharge door.

2. In an apparatus of the class described, the combination of a fulcrumed scale-arm, a magazine pivotally supported upon the inner end thereof, a feed conduit supported above the magazine, a spring restrained closing valve for said conduit, a partition wall and outlet doors for the magazine and means for tilting the magazine when lowered, to discharge its contents.

3. In an apparatus of the class described, the combination of a fulcrumed scale-arm, a magazine pivotally supported upon the inner end thereof, a feed conduit supported above the magazine, a spring restrained closing valve for said conduit arranged to be opened by the magazine when the magazine is raised, a partition wall in the magazine, an outlet door on either side of said wall and means for tilting the magazine when lowered to discharge its contents.

4. In an apparatus of the class described, the combination of a fulcrumed scale arm, a magazine pivotally supported upon the inner end of said arm, a feed conduit above the magazine, a closing valve for said conduit constructed and arranged to be opened by the magazine when the magazine is lowered, and means for tilting the magazine upon its pivotal support when lowered, comprising a drive wheel formed with a series of teeth upon one side, a pinion arranged in position to be actuated by said teeth once during each revolution of said drive wheel, and a connection between said pinion and magazine.

In testimony whereof I affix my signature in presence of two witnesses.

WILHELM SCHWEDE.

Witnesses:
J. A. METZLER,
AUGUST SCHWERDTFEGER.